INFORMATION STORAGE DEVICE EMPLOYING ATOMIC PARTICLE BOMBARDMENT TO EFFECT SEMI-PERMANENT CHANGE IN TARGET LATTICE

Filed July 11, 1958 2 Sheets-Sheet 1

INVENTOR.
JAMES T. SMITH
BY Robert H. Fraser
ATTORNEY

Sept. 18, 1962 J. T. SMITH 3,054,961

INFORMATION STORAGE DEVICE EMPLOYING ATOMIC PARTICLE BOMBARDMENT TO EFFECT SEMI-PERMANENT CHANGE IN TARGET LATTICE

Filed July 11, 1958 2 Sheets-Sheet 2

INVENTOR.
JAMES T. SMITH

BY [signature]

ATTORNEY 3,054,961
INFORMATION STORAGE DEVICE EMPLOYING ATOMIC PARTICLE BOMBARDMENT TO EFFECT SEMI-PERMANENT CHANGE IN TARGET LATTICE

James T. Smith, San Jose, Calif., assignor to International Business Machines Corporation, New York, N.Y., a corporation of New York Filed July 11, 1958, Ser. No. 747,962
20 Claims. (Cl. 328—124)

This invention relates to information storage devices and more particularly to a new and improved information storage device in which information is stored by means of a modification of the luminosity characteristic of a storage member.

In data processing and digital computer systems it is frequently necessary to store a relatively large quantity of digital information. A portion of a data processing system or digital computer which is primarily employed to store information is known as a memory unit, and where a memory unit is arranged to allow the storage and retrieval of the information from any selected location in the memory, the device is known as a random access memory unit.

As the circuit and construction techniques for data processing and digital computer systems are improved, it becomes more and more desirable to store a large quantity of information in a memory unit occupying a small physical space. In addition, as the speed of operation of such systems is increased, it is more and more desirable to provide a memory unit in which information may be stored and retrieved in a relatively short time interval. Accordingly, the present invention is directed to a new and improved information storage device for storing a large quantity of digital information in a relatively small physical space on a random access basis. An additional feature of the present invention is the provision of a new and improved information storage device in which information may be stored on a semi-permanent basis requiring no auxiliary source of power to maintain the storage.

It is a principal object of the present invention to provide a new and improved information storage device in which information is stored by means of a change in the luminosity characteristic of a storage member.

It is another object of the present invention to provide a new and improved storage device in which an element is bombarded with relatively heavy atomic particles to change the luminosity characteristic of the element for the storage of digital information.

It is yet another object of the present invention to provide a new and improved storage device in which information is stored by means of a change in the luminosity characteristic of a storage member and information retrieval is accomplished by scanning the storage member to sense the altered luminosity characteristic in selected locations on the storage member.

Briefly, in accordance with the invention, a source of relatively heavy atomic particles is arranged to bombard the surface of a storage member in selected locations to produce a change in the luminosity characteristic of the storage member. By scanning the storage member and sensing the luminosity characteristic of the storage member in selected locations, stored information may be retrieved.

In one particular arrangement of the invention, a storage member is bombarded from a source of positive ions which are accelerated to an energy level at which atoms occupying a lattice structure near the surface of the storage member are displaced to alter the refractive index of the storage member as a function of information to be stored. The altered refractive index produces a change in the luminosity characteristics of the storage member in the form of an altered coefficient of reflection which may be sensed by scanning the storage member with a light spot and measuring the amount of reflected light.

In an alternative arrangement of the invention a storage member in the form of a layer of phosphor materials is bombarded with heavy atomic particles which displace the atomic structure of the phosphor materials in accordance with information to be stored which produces a change in the luminosity characteristic in the form of a decreased amount of light being given off by the phosphor materials when excited. The surface of the storage member may be scanned by an electron beam to excite the phosphors and the resultant light emitted by the phosphors may be sensed to derive the stored information.

A better understanding of the invention may be had from a reading of the following detailed description and an inspection of the drawings, in which.

Figure 5:
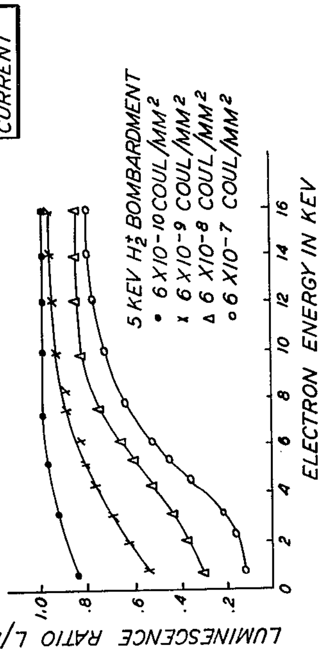
Figure 6:
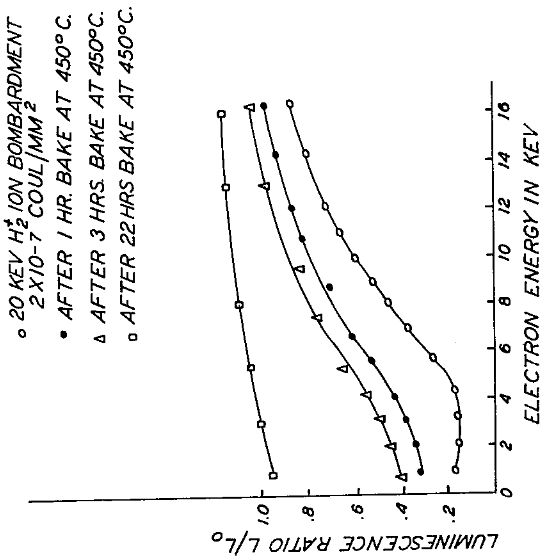

FIG. 5 is a graphical illustration of the ratio of luminescence of a bombarded phosphor material plotted as a function of the energy of an impinging electron beam for various samples of phosphor material each of which has been bombarded with an ion beam of a different density; and FIG. 6 is a graphical illustration of the ratio of light intensity from a bombarded phosphor sample plotted as a function of the energy of an impinging electron beam for various phosphor samples which have been first bombarded by an ion beam and then heated.

In the information storage devices of the invention, the luminosity characteristic of a material is altered for the storage of information. In one embodiment of the invention illustrated in FIG. 1, the luminosity characteristic which is altered is the reflection coefficient of the surface of a material such as a glass plate.

Figures 1, 2, 3:
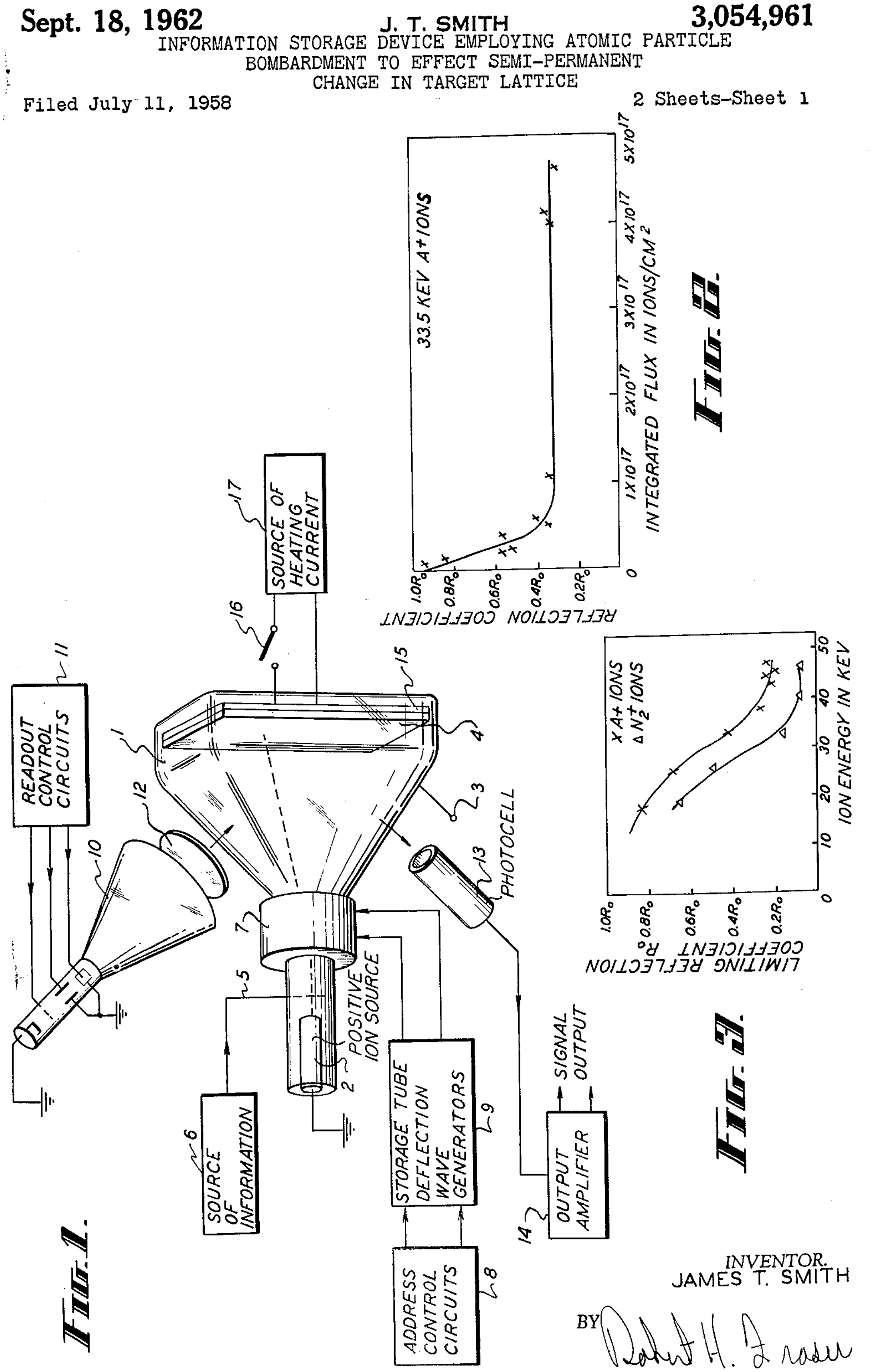
FIG. 1 is a diagrammatic illustration of an information storage system in accordance with the invention in which the reflection coefficient of the surface of a storage member is altered for the storage of information.
FIG. 2 is a graphical illustration of the changes in the reflection coefficient of a material plotted as a function of the integrated flux of a bombarding ion beam.
FIG. 3 is a graphical illustration in which the relationship between the limiting coefficient of reflection of a material is plotted as a function of the energy of an ion beam.

In the apparatus of FIG. 1 there is illustrated an evacuated enclosure 1 which may be similar to the shell of a conventional cathode ray tube from which has been removed substantially all air. Within the evacuated enclosure 1 is a positive ion source 2 adapted to generate relatively heavy atomic particles such as positive ions. The ion source 2 may include conventional focusing means for directing the generated ions into a beam. The ion beam from the source 2 is accelerated towards the large end of the evacuated enclosure 1 by means of an electrostatic field which is created by connecting a source of relatively high potential (not shown) to a terminal 3. The terminal 3 is connected to a conductive inner coating on the tapered sides of the large end of the enclosure 1 and may also be connected to a target plate 4 to establish an electrostatic field between the large end of the enclosure and the ion source 2.

The target plate 4 may be constructed of a material having a relatively closely packed atomic structure in which the atoms are oriented in a lattice arrangement. One suitable material for the target 4 is glass.

The intensity of the beam from the ion source 2 which bombards the surface of the target 4 is determined by a potential applied to a control electrode 5 from a source of information 6. A deflection yoke 7 may include suitable horizontal and vertical deflection windings which deflect the ion beam to bombard any selected location on the target 4. Where the system is to be employed as an information storage device in which information from the source of information 6 is to be stored in a particular addressed location on the target 4, the address control circuits 8 may be arranged to drive the storage tube deflection wave generators 9 to apply suitable currents to the windings in the yoke 7 to deflect the ion beam for bombardment of the selected addressed location of the target 4.

In operation, the ion beam from the ion source 2 is employed to bombard selected locations of the target 4 in such a way as to alter the refractive index of the material of the target 4 in the region in which the bombardment occurs. Due to the fact that materials such as glass have a relatively closely-packed atomic structure, the heavy particle bombardment causes a regional decrease in the density of the atoms at the surface and a subsequent decrease in the index of refraction. Since incident heavy particles do not penetrate the target 4 very deeply and dissipate substantially all their energy in a very thin surface layer, the displacement of the atomic structure at the surface of the target 4 is substantially higher than that which occurs where high energy electrons or neutrons bombard the surface of a material.

Accordingly, it is possible to produce relatively large changes in atomic structure in a relatively short length of time with heavy particles having a relatively low energy.

As is well known, the altering of the refractive index of a material results in a change in the coefficient of reflection at the surface. For example, the reflection of light from a surface is described classically by the Fresnel equations which give for vertically incident light, $$R_0=\left(\frac{1-n}{1+n}\right)^2$$

where $n$ is the refractive index of the medium and $R_0$ is the ratio of reflected intensity to incident intensity. In addition, the reflection coefficient of a surface can be changed markedly by the presence of thin surface films. For the special case of light of wavelength $\lambda$ vertically incident on a layer of thickness $d$, and refractive index $n_1$, which is on a substrate of index $n_2$, the reflection coefficient is $$R=\frac{r_1^2+2r_1r_2\cos 2\delta+r_2^2}{1+2r_1r_2\cos 2\delta+r_1^2r_2^2}$$

where $$r_1=\frac{1-n_1}{1+n_1},\ r_2=\frac{n_1-n_2}{n_1+n_2},\ \text{and}\ \delta=\frac{2\pi n_1 d}{\lambda}$$

The above expressions for the reflection coefficient in the presence of thin surface films are valid for a non-absorbing material. The reflection coefficient is always less than $R_0$, the value with no surface layer, as long as $n_1<n_2$. When $n_1=(n_2)^{1/2}$ and $d=\lambda/4n_1$, the reflection coefficient is zero and the transmission coefficient is one. This means that the change in the index of refraction $n_1$ of the surface layer does not have to penetrate very deeply to obtain an appreciable change in the coefficient of reflection. For example, the change in the index of refraction of the surface layer may be to a depth of the order of $10^{-5}$ cm. so long as the change is such that $(n_1-n_2)>.1$. Accordingly, in the arrangement of FIG. 2, positive ions from the ion source 2 which are accelerated towards the target 4 to bombard the surface with an energy of the order of 50 kiloelectron volts (k.e.v.) produces a substantial change in the coefficient of reflection of the surface of the target 4 in the area bombarded. For a detailed description of the change in the coefficient of reflection of a material bombarded with positive ions, reference is made to an article entitled "Radiation Effect of Positive Ion Bombardment on Glass," by R. L. Hines, Journal of Applied Physics, May 1957.

FIG. 2 is a graphical illustration of the change in the reflection coefficient of glass as a function of the total number of positive argon ions impinging upon the glass with an energy equal to 33.5 k.e.v. per square centimeter. It will be noted from FIG. 2 that there is a saturation of the effect at approximately $5\times10^{16}$ ions per square centimeter, which is probably associated with the equilibrium concentration of displaced atoms in the lattice structure at the surface of the glass. The graph illustrates that the coefficient of reflection drops to approximately one-third of its normal value for light having a wavelength equal to 0.6 micron.

In the apparatus of FIG. 1 the altered reflection coefficient at the surface of the target 4 may be employed to store a large quantity of digital information. Where the digital information is of binary character, the surface of the material at a designated address or location may be bombarded to lower the reflection coefficient with non-bombarded areas maintaining a normal reflection coefficient to indicate an opposite binary value. The stored information in the apparatus of FIG. 1 corresponding to the locations of altered reflection coefficient on the target 4 may be sensed to derive the stored information by scanning the surface of the target 4 with a light spot as from a flying spot scanner. One particular arrangement for scanning thhe target 4 is illustrated in FIG. 1 in which a conventional cathode ray tube 10 generates a spot of light in a location on its face dependent upon the voltages applied to the deflection electrodes from the readout control circuits 11. The spot of light appearing at the face of the cathode ray tube is focused on the surface of the target 4 by means of a lens 12 so that under the control of the readout control circuits 11 the spot of light from the cathode ray tube 10 may be focused on any given location in which information is stored on the surface of the target 4.

Since the spot of light from the cathode ray tube 10 appearing at the surface of the target 4 is of substantially uniform intensity and since the coefficient of reflection varies from one region to another of the target 4 depending on the stored information, the portion of the light from the cathode ray tube 11 reflected by the surface of the target 4 represents the value of the information stored in the location being scanned. The reflected light may be sensed by means of a light sensitive device such as the photocell or photomultiplier tube 13 from which an electrical signal may be applied to an output amplifier 14 to derive an output signal representing the stored information.

Where information is to be stored in the system of FIG. 1 and retrieved in the same sequence in which the storage occurred, the deflection wave generators 9 may be arranged to cause the bombarding ion beam to scan a conventional raster with the flying spot scanner being arranged to follow a like raster in which the flying spot at the surface of the target 4 follows the traverse previously followed by the bombarding ion beam. On the other hand, where the system of FIG. 1 is to be employed on a random access basis in which information is stored and retrieved from any selected location on the target 4, the address control circuits 8 and readout control circuits 11 may be arranged to direct the bombarding ion beam and the light spot to any selected location on the target 4 at will.

FIG. 3 is a graphical illustration of the limiting reflection coefficient as a function of ion energy for high density ion beams of argon ($A^+$) and nitrogen ($N_2^+$). From FIG. 3 it is apparent that the heavier and slower nitrogen ions produce a larger effect than the argon ions. Also, it is apparent that substantially all of the reduction of the reflection coefficient occurs at ion energies less than 40 k.e.v. so that higher energy ions are unnecessary. In the experimental results illustrated in FIGS. 2 and 3, a spot diameter of the order of two millimeters was used which is suitable as a diameter for the focused ion beam at the target 4 in FIG. 1.

The storage of information in the system of FIG. 1 is semi-permanent in nature in that the changed reflection coefficient of the target 4 is unaffected by scanning the target 4 with a spot of light to derive the stored information since the reduction in reflection coefficient is stable at all ordinary temperatures. However, by heating the glass plate to a relatively high temperature for an extended period of time, the original lattice structure at the surface of the plate may be restored to erase the stored information.

By including a heating element 15 in the apparatus of FIG. 1 within the vacuum of the enclosure, the target 4 may be heated to erase previously stored information. Accordingly, by closing a switch 16, a current may be passed through the heating element 15 from a source of heating current 17 to elevate the temperature of the target 4 to a level at which the original uniform atomic structure at the surface of the target 4 is restored and the refractive index assumes its normal value so that the target 4 is ready to receive a subsequent quantity of information.

In the arrangement of FIG. 1 where a 16 centimeter diameter lens aperture is employed with a 15 centimeter square section of glass, it is theoretically possible to obtain of the order of $5\times10^{12}$ bits of information storage. The information may be entered into the storage device at a rate of the order of $10^{-8}$ seconds per bit with a random access of a fraction of a microsecond using a light spot of the order of one micron in diameter. Even though the above figures are based upon a theoretical evaluation of the maximum storage facility, if it is assumed that in a practical embodiment a very low utilization of the maximum theoretical storage is possible, the storage capacity is still very large. For example, if a practical embodiment is only one-tenth of one percent as good as the theoretical indication given above, it may be expected that the storage capacity will equal $5\times10^{9}$ bits of information. Thus, the amount of information which may be stored in a relatively small physical size is extremely large. Since the storage is semi-permanent as indicated above, erasure can be postponed until all of the available storage is used. An alternative arrangement to that of FIG. 1 may employ removable glass storage plates so that new, unused targets may be substituted for additional storage.

Figure 4:
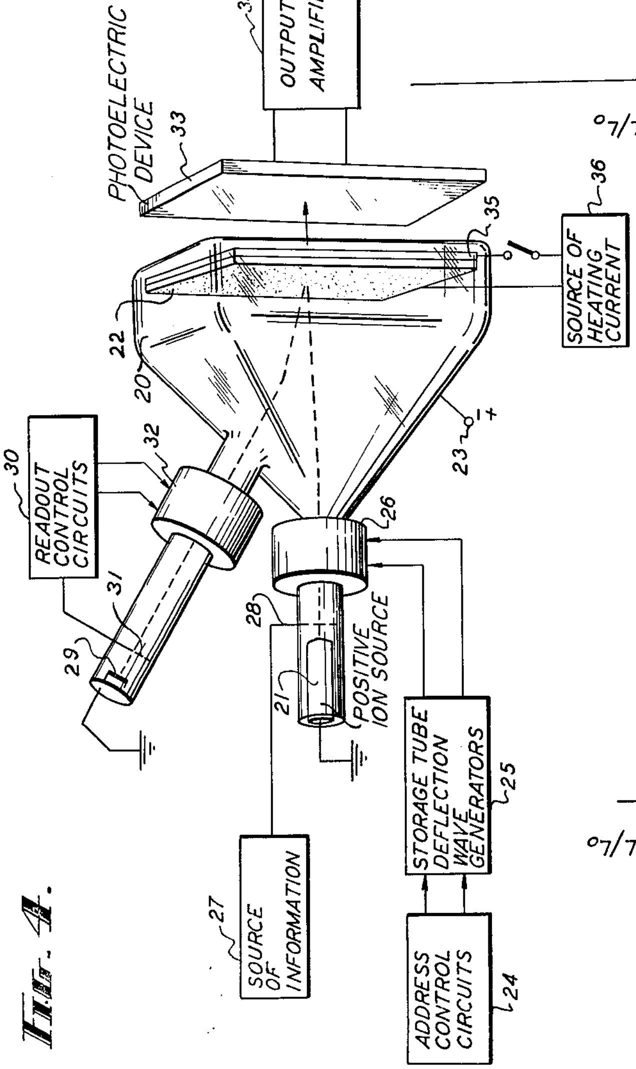
FIG. 4 is a diagrammatic illustration of an information storage system in which the luminescence of a phosphor layer is altered for the storage of information.

FIG. 4 illustrates an alternative arrangement of the invention in which the luminosity characteristic which is altered for the storage of information is the luminescence of a phosphor material. Accordingly, the arrangement of FIG. 4 includes an enclosure 20 within which a beam of heavy particles such as positive ions are supplied by a source 21 and are accelerated towards a target 22 under the influence of an electrostatic field produced by the application of a relatively high negative potential to a terminal 23. The terminal 23 may be connected within the enclosure 20 to a conductive coating along the inner surface of the tapered portion of the enclosure and to the target 22 so as to establish an accelerating electrostatic field. As above, the ion beam from the ion source 21 may be directed to a selected location on the target 22 by means of the address control circuits 24, the storage tube deflection wave generators 25 and a yoke including suitable horizontal and vertical deflection windings. A source of information 27 connected to a control electrode 28 modifies the intensity of the ion beam in accordance with the information to be stored.

In FIG. 4, the target 22 comprises a layer of phosphor materials which may be similar to that employed in a conventional cathode ray tube. However, under the influence of the bombarding positive ion beam from the ion source 21, the luminescence characteristic of the phosphor material is altered in the region in which the bombardment occurs. The change in the luminosity characteristic is thought to arise due to the displacement damage of the lattice of the atomic structure at the surface of the phosphor layer.

In order to sense the luminosity characteristic of the phosphor surface for deriving stored information, the enclosure 20 includes an electron source such as a cathode 29 from which is derived an electron beam. During a reading operation, a positive accelerating potential may be applied to the terminal 23 for accelerating the electron beam from the cathode 29 towards the target 22. The readout control circuits 30 function to bias a control electrode 31 in a direction which allows the electrons from the cathode 28 to be accelerated towards the target 22 under the influence of the electrostatic field generated by the positive potential applied to the terminal 23. In addition, the readout control circuits 30 apply suitable deflection waves to a yoke 32 including suitable horizontal and vertical deflection windings for directing the electron beam from the cathode 28 toward a selected location on the target 22.

In the regions which have not been bombarded by the positive ion beam from the source 21 during the reading operation, the impinging electrons activate the phosphor layer on the target 22 to emit light in a normal fashion. However, due to the displacement of the lattice structure of the phosphors in the regions which have been bombarded by the positive ion beam, a substantially lesser amount of light is emitted in response to the electron beam. Although a photocell and output amplifier in the configuration illustrated in FIG. 1 may be employed in FIG. 4 to sense the variation in light output from the phosphors on the target 22, an alternative arrangement is illustrated in FIG. 4 in which a photoelectric device 33 is oriented to receive light from the face of the enclosure 20. By depositing the phosphors of the target 22 on a transparent base, the light emitted by the phosphors in response to the impinging electron beam is passed to the photoelectric device 33 which produces an electrical signal which may be amplified by an output amplifier 34 to provide an output signal representing the information being derived from the target 22.

The address control circuits 24 in the storage tube deflection wave generators 25 and the readout control circuits 30 may be arranged to cause the ion and electron beams to scan a predetermined raster for entering and deriving information from the system of FIG. 4. However, by directing the positive ion beam to selected addressed locations on the target 22, information may be stored which may be later retrieved by scanning the selected area with the electron beam which may also be directed to the same area under the influence of the readout control circuits 30.

FIG. 5 is a graphical illustration of the ratio of luminescence $$\frac{L}{L_0}$$

which may be defined as the ratio of the light obtained when electrons strike a previously bombarded phosphor as compared to the light obtained when the electrons strike an undeteriorated phosphor. FIG. 5 is a plot of the ratio of luminescence $$\frac{L}{L_0}$$

as a function of energy of an impinging electron beam striking a phosphor layer which has been previously bombarded with positive ($H_2^+$) ions of various densities. From FIG. 5 it may be seen that when positive $H_2^+$ ions of 5 k.e.v. energy bombard the phosphor layer in an intensity of the order of $6\times10^{-7}$ coulombs per square millimeter, a substantial reduction in the luminescence of the phosphor results. It should be noted that the quantities $10^{-10}$ to $10^{-6}$ coulombs per square millimeter in the plot of FIG. 5 may also be expressed as $5\times10^{10}$ to $5\times10^{14}$ ions per square centimeter.

From a comparison of the graphical illustration of FIG. 5 with the graphical illustration of FIG. 2, it is apparent that the effect of lowering the luminescence of a phosphor layer is easier to produce than the alteration of the reflection coefficient of the glass target of FIG. 1 since both the energy and intensity of the bombarding ion beam may be lower in the case of the phosphor layer. For a detailed description of the effect of bombarding a phosphor material with positive ions, reference is made to an article entitled "Deterioration of Luminescent Phosphors Under Positive Ion Bombardment," by J. R. Young, Journal of Applied Physics, November 1955.

Information stored in the arrangement of FIG. 4 as a function of the alteration of the luminosity characteristic of the target 22 is semi-permanent in nature and may be repetitively derived without deterioration at normal operating temperatures. However, as in the case of the information storage device of FIG. 1, the phosphor layer of the target 22 may be restored to its initial substantially uniform atomic structure and luminosity characteristic by elevating the temperature of the material. Accordingly, in the arrangement of FIG. 4, a heating device 35 may be mounted within the enclosure 20 to elevate the temperature of the target 22 in response to a current from a source of heating current 36. The heating device 35 preferably is constructed of fine resistive wires embedded in a transparent base to present a minimum opacity to the passage of light between the phosphor layer 22 and the photocell 33 during a reading operation.

FIG. 6 illustrates the effect of heating a previously bombarded phosphor sample for various lengths of time. In the particular sample selected, after thirty hours of heating at 450° C., substantially all traces of storage disappear. It is anticipated that through the selection of a suitable phosphor material, the length of time required for baking may be substantially reduced.

Although the arrangement of FIG. 4 utilizing a phosphor layer storage element is capable of storing a very large quantity of information in a small physical size, it is expected that the packing density of information within a given target area will be somewhat less than that of the system of FIG. 1 in which the reflection luminosity characteristic of a glass plate is altered to store information since ordinary phosphor layers are somewhat granular in nature and are deposited as small particles.

Although particular structural arrangements of information storage devices in accordance with the invention have been illustrated in FIGS. 1 and 4, it is intended that these be exemplary only of the manner in which the invention may be used to advantage. Accordingly, the invention should be given the full scope of all alternative arrangements falling within the scope of the annexed claims.

What is claimed is:

1. An information storage system including the combination of a storage member having a normally substantially uniform atomic structure, an ion source for providing a beam of atomic particles, means for bombarding predetermined locations on the storage member with atomic particles from the ion source to cause a persistent regional displacement of the atomic structure of the storage member, and means for sensing the regions of displaced atomic structure in the storage member whereby information may be stored by displacing the atomic structure in predetermined regions of a storage member and derived therefrom by sensing the regions of displaced atomic structure.

2. An information storage system including the combination of a storage member having a normally substantially uniform atomic structure, a source of positive ions, means for accelerating a stream of positive ions from said source into collision with the storage member to regionally displace the lattice structure of the storage member in accordance with information to be stored, means for scanning the storage member to sense the regions in which the storage member lattice structure has been regionally displaced by positive ions, and means for deriving an output signal in response to the scanning of the storage member whereby information may be derived from the storage member.

3. An information storage system including the combination of a storage member having a substantially uniform atomic structure, a source of positive ions, means for accelerating a stream of positive ions from said source into collision with the storage member, means deflecting the stream of positive ions to produce a persistent displacement of the atomic structure of the storage member in predetermined regions for the storage of information, means for scanning the storage member to sense the regions of displaced atomic structure, and means for deriving an output signal in accordance with the appearance of light energy in the regions of the storage member being scanned for deriving stored information.

4. An information storage system including the combination of a storage member having a normally substantially uniform luminosity characteristic, an ion source for providing a beam of atomic particles, means for bombarding predetermined locations on the storage member with the beam of particles from the ion source to alter the luminosity characteristic of the storage member in the bombarded location which alteration continues subsequent to bombardment, and means for sensing the regions of altered luminosity characteristic of the storage member whereby information may be stored and retrieved from the information storage system as a function of the altered luminosity characteristic of the storage member.

5. Apparatus in accordance with claim 4 in which a heating element is fixed adjacent the storage member for heating the storage member to a temperature at which a substantially uniform luminosity characteristic is restored to the storage member and the stored information is erased.

6. An information storage system including the combination of a storage member having a substantially uniform reflection coefficient, a source of positive ions, means for accelerating positive ions from said source into collision with the storage member to alter the reflection coefficient of the storage member in predetermined regions corresponding to the storage of information, and means for sensing the regions of altered reflection coefficient to derive stored information from the storage member.

7. Apparatus in accordance with claim 6 in which the sensing means comprises a source of light which is focused on predetermined regions of the storage member, and means for generating an output signal as a function of the amount of reflected light from the storage member.

8. Apparatus in accordance with claim 6 in which a heating element is fixed adjacent the storage member for restoring a substantially uniform reflection coefficient to the storage member whereby previously stored information is erased.

9. An information storage system including the combination of a storage member having a normally substantially uniform luminescence characteristic when subjected to electron bombardment, a source of positive ions, means for bombarding the storage member with positive ions from said source to cause a regional alteration of the luminescence characteristic of the storage member, means for scanning the storage member with a beam of electrons, and means for generating an output signal in accordance with the amount of light produced by the storage member in response to the scanning electron beam.

10. Apparatus in accordance with claim 9 in which a heating element is fixed adjacent the storage member for elevating the temperature of the storage member to a level at which a substantially uniform luminescence characteristic is restored to the storage member and the stored information is erased.

11. An information storage device including the combination of an evacuated enclosure, a storage member mounted adjacent one end of the evacuated enclosure, a positive ion source mounted within the enclosure for producing a beam of positive ions for bombarding the storage member, means for establishing an electrostatic field within the evacuated enclosure for accelerating the positive ions from the ion source into collision with the storage member to produce an altered luminosity characteristic of the storage member for the storage of information, and means for scanning predetermined locations on the storage member to produce an output signal representing the stored information.

12. Apparatus in accordance with claim 11 in which a heating element is placed adjacent the storage member for elevating the storage member to a temperature level at which a substantially uniform luminosity characteristic is restored to the storage member and information is erased.

13. An information storage device including the combination of an evacuated enclosure, a layer of phosphor material mounted within the enclosure and having a substantially uniform luminescence characteristic when bombarded by an electron beam, a source of positive ions arranged within the enclosure to bombard predetermined locations on the phosphor layer to alter the luminescence characteristic of the phosphor layer in the locations bombarded for the storage of information, a source of electrons arranged within the enclosure for scanning the phosphor layer to generate light as a function of the stored information, and a photoelectric device for sensing the light produced by the phosphor layer when scanned by the electron beam for generating an output signal representing the stored information.

14. Apparatus in accordance with claim 13 in which a heating element is mounted within the enclosure adjacent the phosphor layer for elevating the phosphor layer to a temperature at which the uniform luminescence characteristic of the phosphor layer is restored and the stored information is erased.

15. An information storage device including the combination of an evacuated enclosure, a storage plate mounted within the enclosure constructed of a material having a normally relatively uniform reflection coefficient, an ion source mounted within the evacuated enclosure to produce an ion beam for bombarding predetermined locations of the storage plate to alter the reflection coefficient in accordance with information to be stored, means for scanning the storage plate with a light spot, and a photoelectric device arranged to receive the light reflected from the storage plate to produce an output signal representing the stored information.

16. Apparatus in accordance with claim 15 in which a heating element is included within the evacuated enclosure adjacent the storage plate for elevating the temperature of the storage plate to a level at which a substantially uniform reflection coefficient is restored to the storage plate and the stored information is erased.

17. An information storage device including the combination of an evacuated enclosure, a storage member mounted adjacent one end of the evacuated enclosure, an ion source mounted within the enclosure for producing a beam of atomic particles for bombarding the storage member, means for establishing an electrostatic field within the evacuated enclosure for accelerating the atomic particles from the ion source into collision with the storage member to produce an altered luminosity characteristic of the storage member for the storage of information, and means for scanning predetermined locations on the storage member to produce an output signal representing the stored information.

18. Apparatus in accordance with claim 17 in which a heating element is placed adjacent the storage member for elevating the storage member to a temperature level at which a substantially uniform luminosity characteristic is restored to the storage member and information is erased.

19. An information storage device including the combination of an evacuated enclosure, a layer of phosphor material mounted within the enclosure and having a substantially uniform luminescence characteristic when bombarded by an electron beam, a source of ions arranged within the enclosure to bombard predetermined locations on the phosphor layer to alter the luminescence characteristic of the phosphor layer in the locations bombared for the storage of information, a source of electrons arranged within the enclosure for scanning the phosphor layer to generate light as a function of the stored information, and a photoelectric device for sensing the light produced by the phosphor layer when scanned by the electron beam for generating an output signal representing the stored information.

20. Apparatus in accordance with claim 19 in which a heating element is mounted within the enclosure adjacent the phosphor layer for elevating the phosphor layer to a temperature at which the uniform luminescence characteristic of the phosphor layer is restored and the stored information is erased.

References Cited in the file of this patent

UNITED STATES PATENTS

| | | |
|---|---|---|
| 2,143,214 | Selenyi | Jan. 10, 1939 |
| 2,434,930 | Johnson | Jan. 27, 1948 |
| 2,448,594 | Hillier | Sept. 7, 1948 |
| 2,699,512 | Sheldon | Jan. 11, 1955 |
| 2,743,430 | Schulte et al. | Apr. 24, 1956 |
| 2,755,404 | Levy | July 17, 1956 |
| 2,802,962 | Sheldon | Aug. 13, 1957 |
| 2,833,936 | Ress | May 6, 1958 |